Feb. 1, 1955    W. W. GOTTSCHALK    2,701,015
TRIMMING DEVICE
Filed June 29, 1948    4 Sheets-Sheet 1
Fig. I
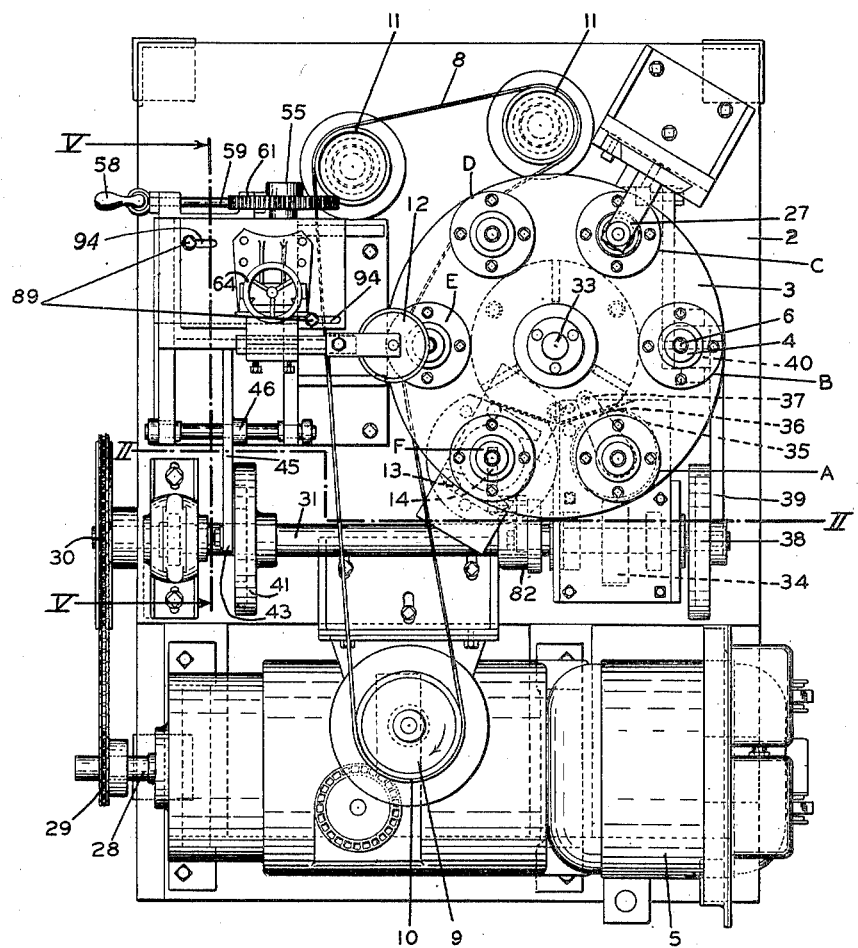
Inventor
WINSTON W. GOTTSCHALK
by
Walter J. Kaufman
Attorney

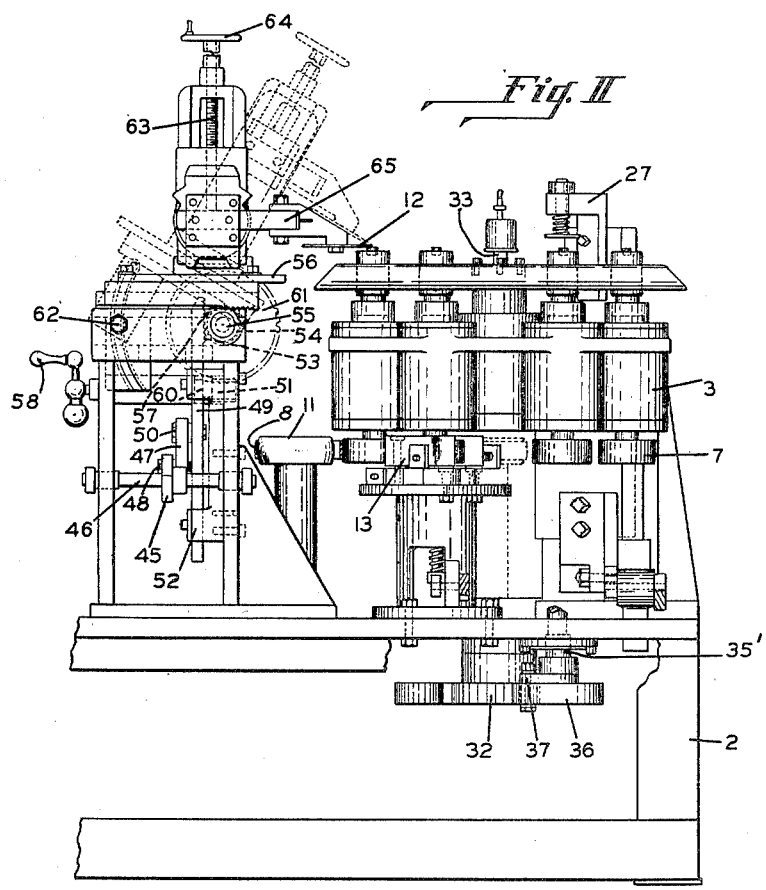

Feb. 1, 1955   W. W. GOTTSCHALK   2,701,015
TRIMMING DEVICE
Filed June 29, 1948   4 Sheets-Sheet 3
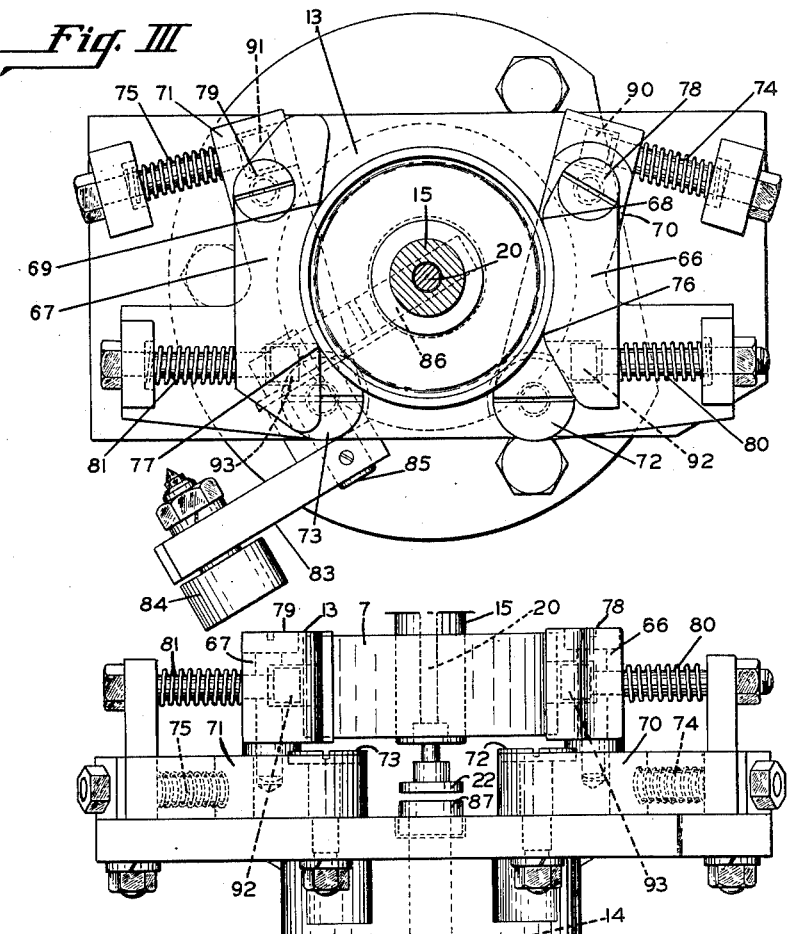
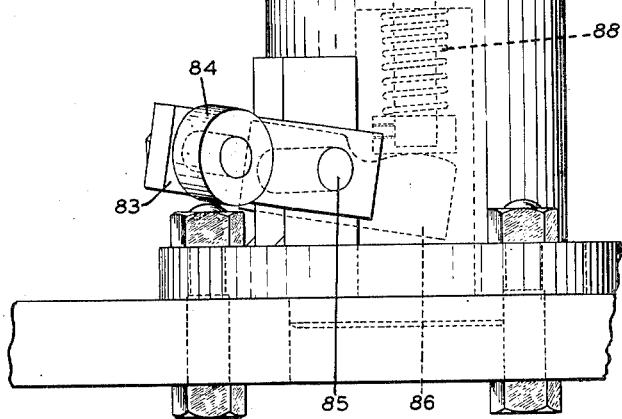
Inventor
WINSTON W. GOTTSCHALK
by
Walter & Kaufman
Attorney Feb. 1, 1955   W. W. GOTTSCHALK   2,701,015
TRIMMING DEVICE
Filed June 29, 1948   4 Sheets-Sheet 4
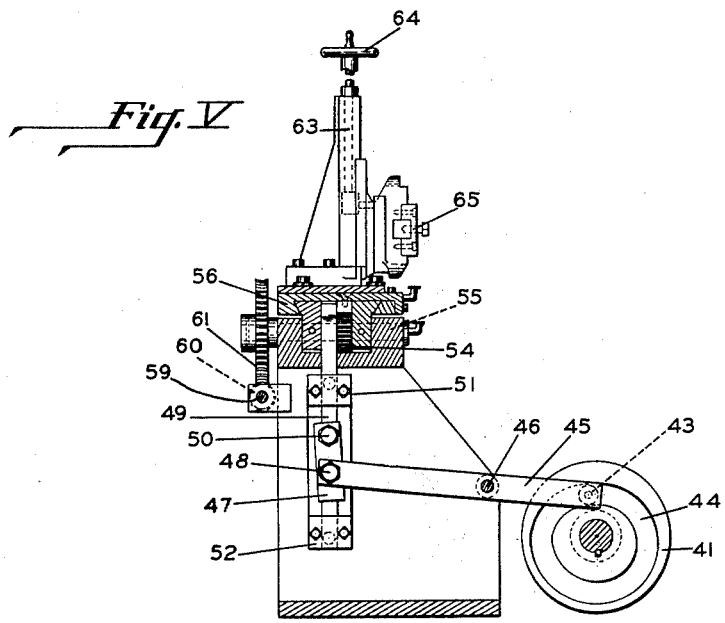
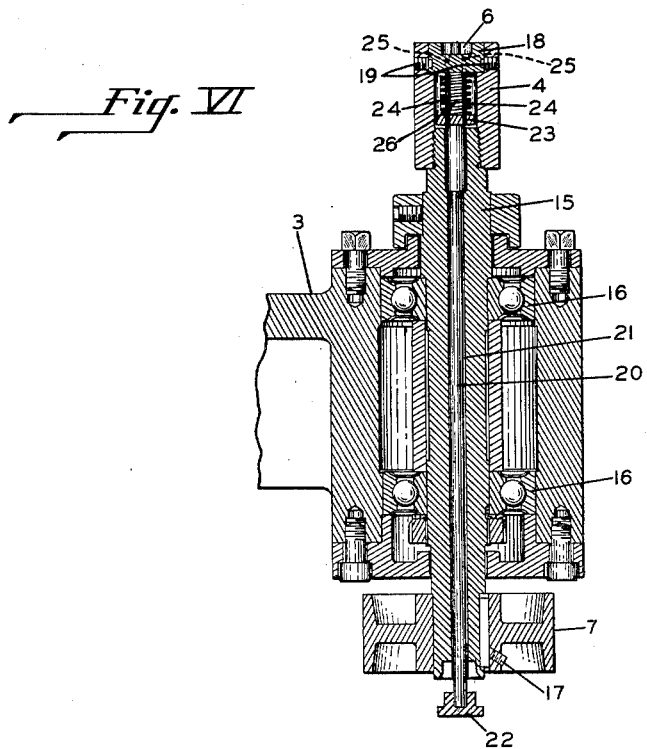
Inventor
WINSTON W. GOTTSCHALK
by
Walter + Kaufman
Attorney

United States Patent Office 2,701,015
Patented Feb. 1, 1955

2,701,015

TRIMMING DEVICE

Winston W. Gottschalk, Lancaster, Pa., assignor to Armstrong Cork Company, Lancaster, Pa., a corporation of Pennsylvania Application June 29, 1948, Serial No. 35,932

3 Claims. (Cl. 164—61)

This invention relates to a trimming device and more particularly to a device for trimming the irregular edges from molded articles such as small cup-shaped rubber parts, and the like. In the device of my invention, the article to be trimmed is placed in a suitable chuck positioned on a drum which is adapted to be intermittently rotated through a number of stations.

The chief object of this invention is to provide a machine whereby small molded articles required to be trimmed to the proper configuration may be rotated at a high rate of speed while in engagement with a cutting knife. After the article has been properly trimmed by the cutting knife, the rotation of the chuck containing the article is halted so that the article may be ejected, and a new workpiece inserted in the chuck.

Another object of this invention is to provide a reciprocating knife so constructed as to be adjustable to allow for variations in the angle at which it operates on a workpiece.

In order that my invention may be more readily understood, it will be described in connection with the accompanying drawings in which:

Figure I is a top plan view of the machine of my invention;

Figure II is an elevational view taken on the line II—II of Figure I with the driving mechanism removed for clarity;

Figure III is an enlarged top plan view of the braking mechanism;

Figure IV is an enlarged elevational view of the braking mechanism;

Figure V is a cross-sectional view taken on the line V—V of Figure I; and

Figure VI is a cross-sectional view of one of the chucks showing the ejector mechanism.

Referring to the drawing, there is shown a support 2 having mounted thereon for intermittent rotary motion a working drum 3, said drum being provided with a plurality of rotatable chucks 4. The motor 5 imparts rotary motion to the drum 3 through suitable gearing. In the embodiment shown in Figure I, the drum 3 has six rotating chucks mounted therein although it will be understood that a greater or lesser number may be used if desired. For ease in describing the various operating stations at which the drum 3 stops, they will be designated by letters A, B, C, D, E, and F. Stations A and B are the stations at which the operator places the cup-shaped article to be operated upon in the small recess 6 located in the center of the top portion of the chuck. At station C a tamper properly seats the article in the chuck. At station D rotary motion is imparted to the chuck by means of the pulley 7 at the bottom of the chuck engaging belt 8 which is operating at a relatively high rate of speed. Belt 8 is rotated by constant speed motor 9, on the shaft of which is secured the belt pulley 10 which drives the belt around idler pulleys 11. The speed of the motor 9 is such that the belt 8 will rotate the chucks 4 at approximately 3,000 R. P. M. At station E a knife 12 engages the rotating workpiece and trims it to the desired configuration. At station F the chuck pulley, which is no longer in engagement with belt 8, contacts a braking device 13 which halts the rotary motion of the chuck. At this same station, the workpiece is ejected from the chuck by means of the ejector mechanism shown generally at 14. The chuck then moves onto station A, and the cycle is repeated. The variable speed gearing between the motor 5 and the drum 3 is such that the drum 3 may be rotated from 3 R. P. M. to 20 R. P. M. The preferred speed of rotation for the drum 3 is approximately 6½ R. P. M.

Referring to Figure VI, there is shown a cross section of one of the chucks 4 which is carried on a spindle 15 rotatably mounted within the drum 3 by means of the two roller bearing rings 16. The pulley 7 is secured to the lower end of spindle 15 by means of the locking set screw 17. At the top of the spindle 15 is positioned the chuck 4 having an insert 18 held therein by means of set screws 19. The insert 18 contains the article holding recess 6. The inserts 18 are removable so that inserts having different size recesses to accommodate different sized molded pieces may be inserted. The ejector mechanism for removing the finished article from the recess 6 comprises an ejector rod 20 passing up through an opening 21 in the center of the spindle 15. The lower end of ejector rod 20 has a head 22 which is engaged by the ejector mechanism 14. The top of ejector rod 20 engages ejector 23 to which is attached a plurality of ejector pins 24. Ejector pins 24 pass through openings 25 in the insert 18. Upward movement of the ejector pins 24 removes the workpiece from the recess 6. The upward movement of the ejector 23 compresses a coil spring 26 positioned between the ejector 23 and the insert 18. When the pressure on the head 22 is released, the spring 26 returns the ejector assembly to its original downward position.

Motor 5 drives the drum 3 and imparts reciprocatory motion to the knife 12, the ejector assembly 14, and the tamper 27. Attached to the motor 5 is a variable speed device and a speed reduction device which drives shaft 28, to which is keyed sprocket 29. Sprocket 29 drives sprocket 30, which is keyed to the main drive shaft 31. Intermittent rotary motion is imparted to the drum 3 through the Geneva wheel 32 which is secured to the shaft 33 about which drum 3 rotates. Gear 34, keyed to shaft 31, engages gear 35, which is keyed to shaft 35'. To the bottom of shaft 35' is attached follower arm 36. Roller 37, secured to follower arm 36, engages Geneva wheel 32 and imparts intermittent rotary motion thereto. Each revolution of the follower arm 36 rotates Geneva wheel 32 one-sixth of a revolution.

On the end of shaft 31 is secured a cam 38. This cam 38 is engaged by arm 39 which pivots about pivot point 40. The other end of arm 39 is attached to the tamper 27 in such manner that the reciprocatory motion imparted to the arm 39 by means of cam 38 causes the tamper to rise and fall. The tamper acts on the article when the chuck containing the article comes to rest at station C.

Cam 41, keyed to drive shaft 31, imparts reciprocatory motion to the cutting knife 12. This is accomplished by means of cam follower 43 which rides in cam track 44 and is attached to the end of rocker arm 45. The rocker arm 45 pivots about pivot point 46 and is attached to link 47 by means of a bolt 48. The other end of link 47 is attached to a gear rack 49 by means of a bolt 50. The gear rack 49 is held in alignment by means of bearings 51 and 52 through which it slides. The purpose of the link 47 is to prevent the rocker arm 45 from pulling the rack 49 out of alignment. The rack teeth 53, on the top of gear rack 49, engage pinion 54 which rotates freely on shaft 55. The cutting knife 12 is adjustably mounted on a slide 56. Slide 56 is provided at the bottom of the structure supporting the cutting knife 12. Attached to the bottom of the slide 56 is a gear rack 57 which is also in engagement with pinion 54.

In order that the knife 12 may be adjusted for cutting at any desired angle, I have provided a hand crank 58, keyed to shaft 59, to the other end of which is keyed a worm 60. The worm 60 is in engagement with gear 61 which is keyed to the shaft 55. In order to clamp the knife in the desired position, I have provided a clamping nut 62 which is loosened before operation of the hand crank 58. When the knife has been placed in the desired angle, clamping nut 62 is tightened, and the mechanism will remain at that proper angle during the operation of the machine. In order to accomplish vertical adjustment of the knife 12, I have provided a hand screw 63 which is operated by means of hand wheel 64. The turning of this hand wheel raises and lowers the knife support 65 to the desired point.

In Figure II, the position of the knife assembly is shown when the knife 12 is operating on a horizontal plane. The knife assembly is also shown in dotted lines in a tilted position suitable for cutting at an angle. It will be observed that when the knife is tilted as shown in dotted lines the knife assembly is much closer to the chuck 4 containing the workpiece when positioned in station E than it is when the knife is operating on a horizontal plane. In order to adjust the distance between the knife support and the workpiece to allow for the reciprocation of the knife, I have provided means for moving the knife assembly with respect to the slide 56. This is accomplished by loosening clamping nuts 89 which permits the knife assembly to be moved, the base of the knife assembly being provided with slots 94 which enable the support to be moved with respect to the clamping nuts 89. When the proper adjustment has been made, the clamping nuts 89 are tightened, and the device is ready for operation.

Referring to Figures III and IV, there is illustrated a self-actuating braking mechanism 13 suitable for halting the rotation of the chuck 4 preparatory to ejection of the workpiece from the recess 6. As the drum 3 rotates in a counter-clockwise direction, the pulley 7 on the bottom of each spindle 15, when approaching station F, contacts the two brake shoes 66 and 67. These brake shoes have arcuate inner surfaces designed to conform to the periphery of the pulley 7 on the bottom of the spindle 15. When moving into the brake shoes 66 and 67, the pulley 7 engages points 68 and 69 on the brake shoes 66 and 67 respectively. Inasmuch as the rotary motion of the drum forces the pulley into the brake shoes, the brake shoes are permitted to separate by means of the construction of the brake. The shoes 66 and 67 are secured to rocker arms 70 and 71 respectively. Rocker arms 70 and 71 are pivotally attached to the frame of the machine by means of screws 72 and 73. As the rocker arm 70 and 71 are pivoting around the pivot screws 72 and 73, springs 74 and 75 are compressed. As the pulley moves into the center of the brake, springs 74 and 75 force the rocker arms 70 and 71 toward one another carrying the brake shoes 66 and 67 with them. This spring action forces the brake shoes into engagement with the rotating pulley 7, and the frictional drag stops the pulley. As the pulley 7 moves out of the brake, it engages points 76 and 77 on the brake shoes 66 and 67. The brake shoes 66 and 67 are secured to the rocker arms 70 and 71 by means of pivot screws 78 and 79. As the brake shoes are forced apart at points 76 and 77, they pivot around points 78 and 79, and in so doing compress springs 80 and 81 thereby allowing the pulley to move out of the brake. After the pulley is clear of the brake, springs 80 and 81 urge the brake shoes back into their original position, and the brake is ready for the next succeeding pulley.

In order to prevent the springs 74 and 75 from returning the rocker arms 70 and 71 too far, I have limited this action by counterboring the rocker arms 70 and 71 in such manner that the enlarged ends 90 and 91 of the bolts passing through and holding the spring 74 and 75 contact the shoulder of the counterbored section. The brake shoes 66 and 67 are counterbored in a similar manner so that the enlarged heads 92 and 93 of the bolts holding the springs 80 and 81 will engage the shoulder of the counterbored section. These bolt heads 90, 91, 92, and 93 prevent the movable parts of the brake assembly from moving too far under the action of the spring.

In a brake of this type in which both ends of the brake shoe are spring urged, and the pressure exerted on the brake shoe is substantially the same at both ends, a uniform pressure is exerted on the brake lining at all points along the arcuate surface of the brake. This causes uniform wear on the brake lining and exerts a pressure over a greater area of the rotating pulley, thereby gaining greater efficiency from the brake.

In a device of the type I have developed for operation at a speed permitting the chucks to stop at each station only a fraction of a second, it is essential that the braking action be practically instantaneous. It has been found impractical to use a brake operating from a linkage attached to the driving mechanism because too much of the time during which the chuck is at station F would be consumed in closing and opening the brake. In the device illustrated and described herein, the braking action is effective from the instant the pulley touches the brake shoes until it leaves the brake shoes.

It is essential that the rotation of the chuck be halted before the workpiece is ejected. If the rotation is not halted, the centrifugal force of the rotating chuck causes the ejected article to be thrown off at a tangent so that the articles cannot be collected into a suitable receptacle.

While the chuck is positioned in station F with the pulley 7 engaged by the brake 13, the workpiece is ejected therefrom by means of ejector 14 shown in Figure IV. The ejector 14 is operated by a cam 82 keyed to drive shaft 31. This cam 82 imparts reciprocatory motion to rocker arm 83 by means of cam roller 84 which is attached to the rocker arm. Rocker arm 83 is pivoted about a pivot point 85. As downward motion is imparted to arm 83, the arm pivots about pivot point 85, and the head 86, on the opposite end of the rocker arm, strikes the bottom of the ejector 14 and moves it up through the brake support. The ejector 14 has an enlarged end 87 which engages the enlarged head 22 on the bottom of the ejector rod 20. When the arm 83 is raised, the head 86 is lowered and spring 88 which has been compresesd forces the ejector 14 to its downward position as shown in Figure IV. The return of ejector 14 to its downward position breaks the contact between the enlarged end 87 and the head 22 on the bottom of the ejector rod 20 passing through the spindle 15. The breaking of this contact causes the ejector 23 to return to its original downward position so that another workpiece can be placed in the recess 6.

In the operation of my machine, the small cup-shaped washer, or other molded article desired to be trimmed is placed in the recess 6 of the insert 18 in the chuck 4 at either stations A or B. The chuck which was stopping at station B is then moved onto station C by means of the intermittent rotary motion imparted to the drum 3 by the motor 5 through the drive mechanism which engages the Geneva wheel 32. At station C, the tamper 27, in its upper position, is brought down by means of arm 39 which is operated by cam 38 secured to the end of the drive shaft 31. This tamper 27 seats the molded article in the recess 6. After the article has been properly positioned in the recess 6, the chuck moves onto station D where rotary motion is imparted to the chuck by means of belt 8 which engages pulley 7 which is secured to the bottom of the spindle 15. The chuck is then moved onto station E, and it will be noted that the belt 8 is still in engagement with pulley 7, and the chuck is still rotating at approximately 3,000 R. P. M. After the chuck has stopped at station E, the knife 12 is urged forward toward the chuck and engages the rotating article and trims it to the desired configuration. The forward motion of the knife 12 is accomplished by means of cam 41 which operates rocker arm 45, thereby imparting up-and-down motion to the gear rack 49 which is in engagement with gear 54. Gear 54 also engages horizontal gear rack 57 attached to the bottom of slide 56 which serves as the supporting structure for the knife 12. The upward motion of the rack 49 rotates gear 54 in a clockwise direction which, in turn, forces horizontal gear rack 57 forward. The downward movement of rack 49 forces rack 57 rearwardly. This reciprocatory movement of the gear rack 57 causes the slide 56 to move forward and backward on the guideways 42. The cam track 44 is so designed that the knife will be held in engagement with the rotating article for a sufficient period of time to properly trim the same while the chuck is located in station E. The knife is then withdrawn from its engagement with the article by means of the cam 41 to its rearward position, and the chuck moves onto station F.

At station F the pulley 7 is no longer in engagement with the belt 8, but the chuck is still rotating by means of the momentum imparted to it by the belt. As the chuck enters station F, the pulley 7 strikes points 68 and 69 on brake shoes 66 and 67. The intermittent rotary motion imparted to the drum forces the pulley in between the brake shoes. This is accomplished by rocker arms 70 and 71 acting against the spring 74 and 75 to separate the brake shoes sufficiently far to allow the pulley to pass into the center of the brake. The chuck stops at station F and brake shoes 66 and 67 exert a frictional drag on the pulley 7, and the rotary motion is halted.

While in station F, the cam 82 secured to shaft 31 forces the end of rocker arm 83 downwardly. Since rocker arm 83 pivots about pivot point 85, the head 86 is raised which in turn forces the ejector 14 in an upwardly direction, and its enlarged end 87 strikes the head 22 on the bottom of ejector rod 20 passing through the spindle 15. The ejector 23, at the top of ejector rod 20 is forced upwardly and the pins 24 eject the finished article from the recess 6 of the chuck 4. After the article has been ejected, the cam 82 forces the end of rocker arm 83 upwardly, thereby pulling down head 86. The ejector 14 is then returned to its downward position by means of spring 88. This breaks the contact between the enlarged end 87 and the head 22 of the ejector rod 20, thereby enabling spring 26 to force the ejector 23 downwardly, and the recess 6 is ready to receive another workpiece. After the workpiece has been ejected from the chuck, the chuck starts to move from station F toward station A. This movement of the chuck forces the pulley 7 against the points 76 and 77 of the brake shoes 66 and 67. This pressure against points 76 and 77 forces the brake shoes to pivot about pivot points 78 and 79 against the springs 80 and 81. After the pulley has cleared points 76 and 77, springs 80 and 81 cause the brake shoes to return to their original position before the next pulley is received in the self-actuating brake. After leaving station F, the chuck moves onto station A and the cycle is repeated.

Occasionally in the trimming of molded articles such as those described herein, it is desired to trim the edge of the article on a bevel. In order to do this, it is necessary to adjust the knife on an angle so that it will cut the proper bevel on the rotating article. The apparatus developed by me enables this operation to be carried out using the same reciprocatory driving mechanism for operating the knife. In order to adjust the knife to the proper bevel, the operator loosens clamping nut 62 and turns hand crank 58 which is keyed to shaft 59 to which is attached worm 60. Worm 60 is in engagement with gear 54 which is keyed to shaft 55. This enables the entire slide mechanism to rotate about the center of the shaft 55 thereby keeping gear rack 57 secured to the bottom of slide 56 in engagement with gear 54 regardless of the angle through which the slide mechanism is rotating. Inasmuch as gear 54 is not keyed to the shaft 55, it merely slips around the shaft while the slide mechanism is being rotated to the proper angle. When the slide mechanism has been rotated to the proper angle, clamping nut 62 is tightened and the knife 12 is adjusted by means of hand wheel 64 attached to screw 63 which raises and lowers the knife to the desired point.

While I have described my invention showing a series of six stations, it will be understood that the invention may be carried out on a machine with a greater or lesser number of stations depending on the number and type of operations to be performed on the articles.

It will be obvious to those skilled in the art that I have developed a device in which small molded articles such as rubber, etc., may be placed in a suitable chuck and rotated past a trimming knife, which knife reciprocates and its reciprocatory motion can be imparted through any angle desired in order to cut the proper bevel on the molded article. After the article has been trimmed, the rotating chuck is halted by means of a self-actuating brake which has no connection whatsoever with the driving mechanism of the machine. The operation of the machine is completely automatic with the exception of placing the workpiece in the chuck at stations A and B and, of course, with the minor exception of adjustments which must be made when the angle through which the knife reciprocates is altered.

While I have illustrated and described certain preferred embodiments of my invention, it will be understood that the same is not so limited, but may be otherwise practiced within the scope of the following claims.

I claim:

1. A device for imparting reciprocatory motion to a cutting tool, the combination comprising a support, a slide mounted on said support for reciprocatory movement with respect thereto, a cutting tool mounted on said slide, a shaft keyed to said support, a pinion mounted on said shaft for free rotation with respect thereto, a gear rack mounted on said slide for engagement with said freely rotating pinion, a second gear rack for engagement with said pinion, means for imparting reciprocatory motion to said second gear rack to in turn impart reciprocatory rotary motion to the pinion, means for rotating said shaft to rotate said support about the axis of the pinion to change the angle of operation between the racks, and means for adjusting the cutting tool with respect to the slide.

2. A device for imparting reciprocatory motion to a cutting tool, the combination comprising a support, a slide mounted on said support for reciprocatory movement with respect thereto, a cutting tool mounted on said slide, a shaft keyed to said support, a pinion mounted on said shaft for free rotation with respect thereto, a gear rack mounted on said slide for engagement with said freely rotating pinion, a second gear rack for engagement with said pinion, means for imparting reciprocatory motion to said second gear rack to in turn impart reciprocatory rotary motion to the pinion, and means for rotating said shaft to rotate said support about the axis of the pinion to change the angle of operation between the racks.

3. In a trimming device, the combination of an intermittently rotated drum, a plurality of rotatable chucks carried by said drum, a workpiece-receiving recess located in each of said chucks, a belt adapted to rotate said chucks during a portion of the cycle of rotation of the drum, a reciprocating knife synchronized with the rotating drum to bring it into engagement with the workpiece carried by said chuck while said chuck is being rotated by said belt, said reciprocating knife comprising a support, a slide mounted on said support for reciprocatory movement with respect thereto, a cutting tool mounted on said slide, a shaft keyed to said support, a pinion mounted on said shaft for free rotation with respect thereto, a gear rack mounted on said slide for engagement with said freely rotating pinion, a second gear rack for engagement with said pinion, means for imparting reciprocatory motion to said second gear rack to impart reciprocatory rotary motion to the pinion, and means for rotating said shaft to rotate said support about the axis of the pinion.

References Cited in the file of this patent

UNITED STATES PATENTS

| Number | Name | Date |
|---|---|---|
| 593,533 | Campbell | Nov. 9, 1897 |
| 963,610 | Matheus | July 5, 1910 |
| 965,034 | Slick | July 19, 1910 |
| 1,125,809 | Boker | Jan. 19, 1915 |
| 1,631,579 | Bullard | June 7, 1927 |
| 1,674,467 | Davis | June 19, 1928 |
| 1,758,729 | Wilson | May 13, 1930 |
| 1,926,990 | Schmidt | Sept. 12, 1933 |
| 2,026,459 | Caretta | Dec. 31, 1935 |
| 2,251,135 | Iknayan | July 29, 1941 |
| 2,271,583 | Dornhofer et al. | Feb. 3, 1942 |
| 2,377,384 | Slovak | June 5, 1945 |
| 2,449,773 | Hargreaves et al. | Sept. 21, 1948 |
| 2,471,052 | Wein | May 24, 1949 |
| 2,528,731 | Steele | Nov. 7, 1950 |

FOREIGN PATENTS

| Number | Country | Date |
|---|---|---|
| 13,111 | Great Britain | June 10, 1904 |
| 192,544 | Switzerland | Nov. 1, 1937 |